US012620800B2

(12) United States Patent
Kao et al.

(10) Patent No.: US 12,620,800 B2
(45) Date of Patent: May 5, 2026

(54) DC SYSTEM PROTECTION APPARATUS WITH COMMUNICATION RESETTING FUNCTION

(71) Applicant: Ship and Ocean Industries R&D Center, New Taipei (TW)

(72) Inventors: Han-Chun Kao, New Taipei (TW); Ta-Hsiu Tseng, New Taipei (TW); Yu-Wei Lin, New Taipei (TW); Chung-Ching Lin, New Taipei (TW); Wei-Chun Cheng, New Taipei (TW); Sen-Tung Wu, Huwei Township (TW); Yu-Kai Huang, Huwei Township (TW)

(73) Assignee: SHIP AND OCEAN INDUSTRIES R&D CENTER, New Taipei City (TW)

( * ) Notice: Subject to any disclaimer, the term of this patent is extended or adjusted under 35 U.S.C. 154(b) by 191 days.

(21) Appl. No.: 18/395,607

(22) Filed: Dec. 24, 2023

(65) Prior Publication Data

US 2025/0210973 A1      Jun. 26, 2025

(30) Foreign Application Priority Data

Dec. 22, 2023    (TW) .................................. 112150246

(51) Int. Cl.
*H02H 7/26*          (2006.01)
*H02H 1/00*          (2006.01)
(52) U.S. Cl.
CPC .......... *H02H 7/268* (2013.01); *H02H 1/0007* (2013.01); *H02H 1/0061* (2013.01)
(58) Field of Classification Search
CPC .... H02H 1/0007; H02H 1/0061; H02H 3/087; H02H 3/0935; H02H 7/268

(Continued)

(56) References Cited

U.S. PATENT DOCUMENTS

2021/0111717 A1    4/2021   Fechalos et al.

FOREIGN PATENT DOCUMENTS

CN        112152599  A     12/2020
CN        114256820  A   *  3/2022  .............. H02H 7/268
(Continued)

OTHER PUBLICATIONS

Machine translation of Sun et al. Chinese Patent Document CN 114256820 A Mar. 2022 (Year: 2022).*

(Continued)

*Primary Examiner* — Kevin J Comber
(74) *Attorney, Agent, or Firm* — Cheng-Ju Chiang

(57)          ABSTRACT

The present invention provides a DC system protection apparatus with a communication resetting function, which includes at least one load, at least one DC power supply system, a DC solid-state circuit breaker, a current sensor, a reset/break controller and a reset communication module. The at least one DC power supply system is connected to the at least one load. The DC solid-state circuit breaker is connected in series with the at least one load and the at least one DC power supply system. The current sensor is connected in series with the DC solid-state circuit breaker, the at least one load and the at least one DC power supply system. The reset/break controller is connected to the current sensor, and controls breaking and resetting of the DC solid-state circuit breaker. The reset communication module is connected to the reset/break controller.

6 Claims, 2 Drawing Sheets

10

(58) Field of Classification Search
USPC ........................................................ 361/93.1
See application file for complete search history.

(56) References Cited

FOREIGN PATENT DOCUMENTS

| | | | | | | |
|---|---|---|---|---|---|---|
| CN | 114530832 | A | * | 5/2022 | .............. | H02H 7/22 |
| CN | 115513915 | A | * | 12/2022 | ............. | H02H 3/093 |
| EP | 2632048 | A1 | * | 8/2013 | ............. | H02H 9/001 |
| TW | 202022911 | A | | 6/2020 | | |
| WO | WO-2022211605 | A1 | * | 10/2022 | ............. | H02H 7/205 |

OTHER PUBLICATIONS

Machine translation of Yun et al. International Patent Document WO 2022/211605 A1 Oct. 2022 (Year: 2022).*
Machine translation of Tang et al. Chinese Patent Document CN 115513915 A Dec. 2022 (Year: 2022).*
Machine translation of Zhang et al. Chinese Patent Document CN 114530832 A May 2022 (Year: 2022).*

* cited by examiner

10

DC SYSTEM PROTECTION APPARATUS WITH COMMUNICATION RESETTING FUNCTION

FIELD OF THE INVENTION

The present invention relates to a DC system protection apparatus with a communication resetting function, and more particularly to a DC system protection apparatus with a communication resetting function capable of quickly disconnecting a load with an anomaly and performing resetting via external communication when a device serving as the load is abnormal.

DESCRIPTION OF THE PRIOR ART

As electric vehicles are gradually becoming the mainstream vehicle on the market, and the raising attention is paid to techniques related to power control and safety of these vehicles. In particular, in the technical field of ships, higher safety requirements are demanded for each load in a power system for pure electric ships or hybrid electric ships.

The reason is that a ship sailing on the sea is de facto in an isolated state, and this state means that a result of any fire caused by a power system anomaly while the ship sails on the sea can be catastrophic. Thus, in the event of any anomaly in a power system or a load of pure electric ships or hybrid electric ships, disconnecting the load with an anomaly within the shortest period of time is a critical safety measure.

However, in common mechanical high-voltage circuit breakers, a current may reach as high as several thousands of amperes during an interruption of a fault current. Moreover, due to a connection to an inductor, a peak value in a voltage may be even higher. Such voltage leads to arcing, which vaporizes contacts of the circuit breaker. In addition, a DC current causes arcing to persist, and there is no zero-crossing for eliminating such arcing which is present in an AC current.

Furthermore, a speed between a connection and a disconnection of the conventional mechanical high-voltage circuit breakers above is rather slow and may take up to tens of milliseconds, and this allows energy that may cause impairment to pass through during short-circuitry. As the conventional mechanical high-voltage circuit breakers above age, a trip speed thereof is directly affected, hence causing an even greater loss.

SUMMARY OF THE INVENTION

To overcome the issues of the prior art described above, the present invention provides a DC system protection apparatus with a communication resetting function.

More specifically, the DC system protection apparatus with a communication resetting function provided by the present invention includes at least one load, at least one DC power supply system, a DC solid-state circuit breaker, a current sensor, a reset/break controller and a reset communication module.

The at least one DC power supply system is connected to the at least one load. The DC solid-state circuit breaker is connected in series with the at least one load and the at least one DC power supply system. The current sensor is connected in series with the DC solid-state circuit breaker, the at least one load and the at least one DC power supply system. The reset/break controller is connected to the current sensor, and controls breaking and resetting of the DC solid-state circuit breaker. The reset communication module is connected to the reset/break controller.

With the present invention, the issues of arcing, mechanical wear and slow disconnection speeds generated in mechanical high-voltage circuit breakers in a DC power system can be solved.

The above summary of the present invention aims to provide a basic illustration for various aspects and technical features of the present invention. The summary of the invention is not a comprehensive description of the present invention, and is not intended to specifically enumerate examples of key or critical elements of the present invention, nor is it intended to define the scope of the present invention, but is to present several concepts of the present invention in a simple form.

DETAILED DESCRIPTION OF THE EMBODIMENTS

For understanding the technical features and practical effects of the present invention, implementation can be carried out according to the contents of the detailed description given by way of the preferred embodiments described in detail with reference to the accompanying drawings below.

Figure 1:
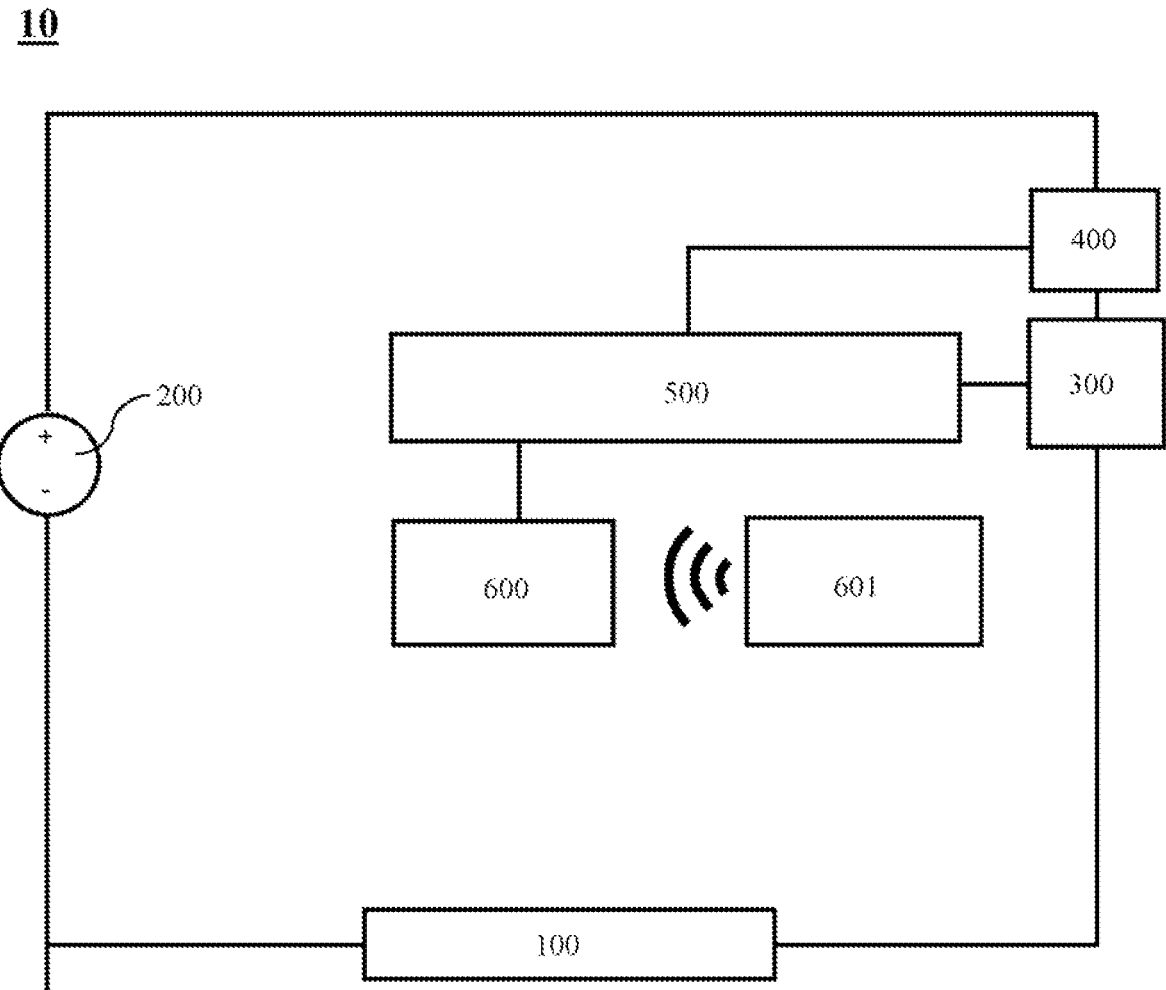
FIG. 1 is a schematic diagram of a circuit structure of a DC system protection apparatus with a communication resetting function according to an embodiment of the present invention.

Please Refer to FIG. 1, FIG. 1 shows a schematic diagram of a circuit structure of a DC system protection apparatus 10 with a communication resetting function according to an embodiment of the present invention. The DC system protection apparatus 10 with a communication resetting function shown in this embodiment includes a load 100, a DC power supply system 200, a DC solid-state circuit breaker 300, a current sensor 400, a reset/break controller 500 and a reset communication module 600.

The DC power supply system 200 is connected to the load 100. In this embodiment, the DC system protection apparatus 10 with a communication resetting function is applied to a part in a power system of an electric ship. Thus, the load 100 can be any electric propulsion system of an electric ship, a boom, or other devices that can be driven by electricity, and is not specifically defined in the present invention.

Moreover, in this embodiment, the DC solid-state circuit breaker 300 is connected in series with the load 100 and the DC power supply system 200. Moreover, the current sensor 400 is connected in series with the DC solid-state circuit breaker 300, the load 100 and the DC power supply system 200. In this embodiment, a power supply voltage of the DC power supply system 200 is between 100 V and 400 V. In addition, the DC solid-state circuit breaker 300 is a unidirectional self-powered DC solid-state circuit breaker (DC SSCB).

Figure 2:
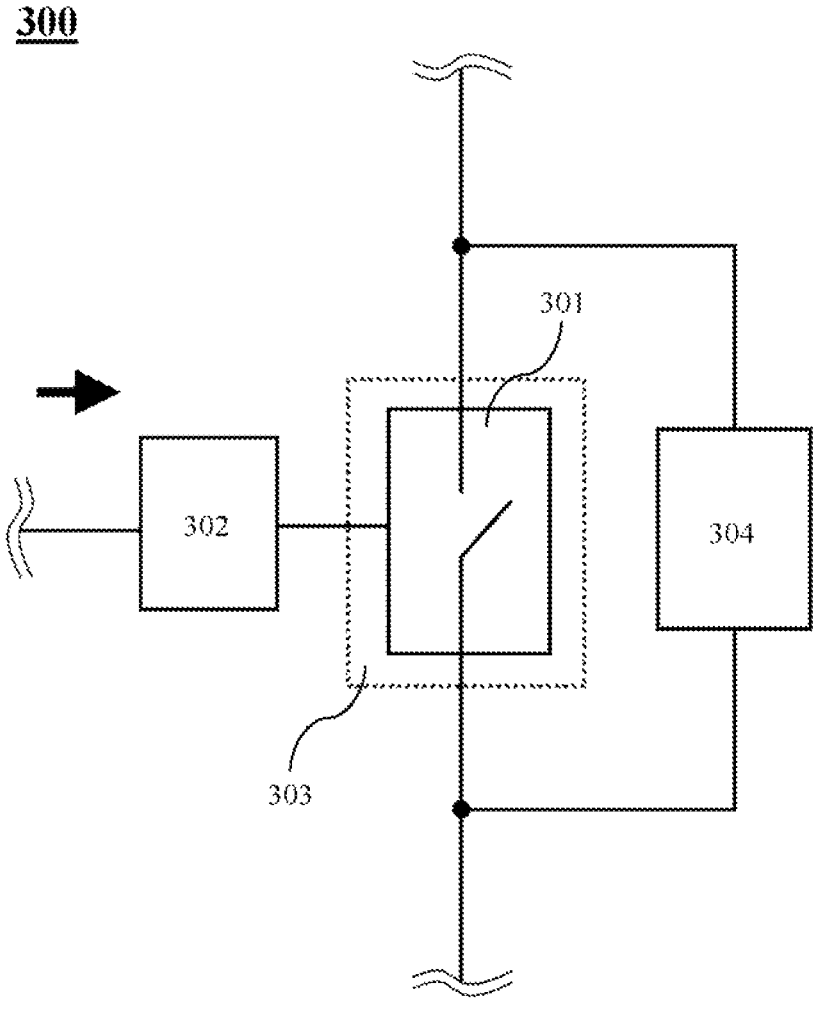
FIG. 2 is a schematic diagram of a circuit structure of a DC solid-state circuit breaker according to an embodiment of the present invention.

Referring to FIG. 2, FIG. 2 shows a schematic diagram of a circuit structure of a DC solid-state circuit breaker according to an embodiment of the present invention. As shown in FIG. 2, in this embodiment, the DC solid-state circuit breaker 300 includes a power semiconductor element 301, a gate driver 302, a cooling structure 303 and a voltage clamping circuit 304.

The power semiconductor element 301 is connected to the current sensor 400 and the load 100, and the gate driver 302 is connected to the power semiconductor element 301. In this embodiment, the gate driver 302 receives a pulse width modulation (PWM) signal from the reset/break controller 500 in FIG. 1. Moreover, the power semiconductor element 301 is a silicon carbide (SiC) junction field effect transistor (JFET). Accordingly, the gate driver 302 can control according to the signal received whether the power semiconductor element 301 is to be tripped.

In this embodiment, the cooling structure 303 is connected to the power semiconductor element 301. The cooling structure 303 can be implemented by a metal cooling fin, a heat dissipation paste or a water-cooling structure, and is not specifically defined in the present invention. The voltage clamping circuit 304 bridges two ends of the power semiconductor element 301. The voltage clamping circuit 304 can provide a negative voltage of –2 V to –3 V to reduce an overall trip time of the DC solid-state circuit breaker 300.

In this embodiment, the reset/break controller 500 is connected to the current sensor 400. More specifically, current sensor 400 in this embodiment is a Hall effect-based current sensor. Between the reset/break controller 500 and the gate driver 302 in the DC solid-state circuit breaker 300, the PWM signal issued by the reset/break controller 500 is transmitted via a forward-flyback circuit.

More specifically, the reset/break controller 500 in this embodiment employs an Arduino™ board as a primary circuit control source in the controller. Moreover, with the forward-flyback circuit included, the Arduino™ board in the reset/break controller 500 can determine according to whether a current sensed by the current sensor 400 exceeds a break threshold (16 amperes (A) in this embodiment) as a basis to determine whether there is an anomaly in the load 100, further determining whether to drive the DC solid-state circuit breaker 300 to be disconnected within 100 μs.

More specifically, the reset/break controller 500 of this embodiment is capable of controlling breaking and resetting of the DC solid-state circuit breaker 300. When the current sensor 400 detects that the current flowing through is greater than the break threshold (16 A in this embodiment), the current sensor 400 notifies the reset/break controller 500 to transmit a PWM signal with an increased duty cycle via the forward-flyback circuit. As shown by the arrow in FIG. 2, the PWM signal with an increased duty cycle directly causes the gate driver 302 to drive the power semiconductor element 301 to be disconnected, hence achieving the effect of disconnecting a power supply to the load 100 within an extremely short period of time.

In this embodiment, the speed of transmitting the PWM signal from the gate driver 302 to the power semiconductor element 301 for the disconnection gets faster as the duty cycle of the PWM signal increases. For example, when a voltage input to the load 100 is 100 V, upon the current sensor 400 detecting that the current flowing through is greater than the break threshold, an operation of disconnecting the power supply to the load 100 takes merely 48 μs in this embodiment.

As a matter of course, once an anomaly occurs in the load 100, it is expected that the overall power system has to be checked to determine whether there are other short circuits or anomalies, such that the current of the overall DC power system is increased and exceeds the break threshold. One most important measure is the need to use a three-purpose electric meter to measure whether the DC solid-state circuit breaker 300 is broken down by the current. Once it is determined that the DC solid-state circuit breaker 300 and other parts of the DC power system are functioning well, the reset/break controller 500 uses the reset communication module 600 connected thereto as a basis for a signal for remote resetting.

More specifically, the reset communication module 600 in this embodiment is an Arduino™ board having a communication function, and can receive an external signal from a communication apparatus 601 similarly having an Arduino™ board to determine whether a user issues a reset command (which indicates that after checking by the staff, the overall DC power system contains no anomalies and the DC solid-state circuit breaker 300 is not broken down by the current) in this embodiment.

Thus, after it is confirmed that the reset communication module 600 has received the reset command from the external communication, the reset communication module 600 notifies the reset/break controller 500 to transmit a PWM signal with a reduced duty cycle via the forward-flyback circuit, for the gate driver 302 to close the power semiconductor element 301 to allow the DC power supply system 200 to resume the power supply to the load 100, hence completing a reset operation.

The description above provides merely preferred embodiments of the present invention, and is not to be construed as limitations to the scope of implementation of the present invention. All simple and equivalent variations and modifications made to the embodiments based on the claims and the detailed description of the present invention are encompassed within the scope of the present invention.

REFERENCE NUMBERS EXPLANATION

10 DC system protection apparatus with a communication resetting function
100 load
200 DC power supply system
300 DC solid-state circuit breaker
301 power semiconductor element
302 gate driver
303 cooling structure
304 voltage clamping circuit
400 current sensor
500 reset/break controller
600 reset communication module
601 communication apparatus

What is claimed is:

1. A DC system protection apparatus with a communication resetting function, comprising:
   at least one load;
   at least one DC power supply system, connected to the at least one load;
   a DC solid-state circuit breaker, connected in series with the at least one load and the at least one DC power supply system;
   a current sensor, connected in series with the at DC solid-state circuit breaker, the at least one load and the at least one DC power supply system;
   a reset/break controller, connected to the current sensor, the reset/break controller controlling breaking and resetting of the DC solid-state circuit breaker; and
   a reset communication module, connected to the reset/break controller;

US 12,620,800 B2

5 wherein the DC solid-state circuit breaker comprises:

a power semiconductor element, connected to the current sensor and the at least one load;

a gate driver, connected to the power semiconductor element, the gate driver receiving a pulse width modulation (PWM) signal from the reset/break controller;

a cooling structure, connected to the power semiconductor element; and a voltage clamping circuit, bridging two ends of the power semiconductor element;

wherein the PWM signal issued by the reset/break controller is transmitted via a forward-flyback circuit between the reset/break controller and the DC solid-state circuit breaker;

wherein when the current sensor detects that a current flowing through is greater than a break threshold, the current sensor notifies the reset/break controller to transmit a PWM signal with an increased duty cycle via the forward-flyback circuit, for the gate driver to drive the power semiconductor element to be disconnected;

wherein the reset communication module, upon receiving a reset signal, notifies the reset/break controller to transmit a PWM signal with a reduced duty cycle via the forward-flyback circuit, for the gate driver to drive the power semiconductor element to be reset.

2. The DC system protection apparatus with a communication resetting function according to claim 1, wherein a voltage of the at least one DC power supply system is between 100 V and 400 V.

3. The DC system protection apparatus with a communication resetting function according to claim 1, wherein the DC solid-state circuit breaker is a unidirectional self-powered DC solid-state circuit breaker (DC SSCB).

4. The DC system protection apparatus with a communication resetting function according to claim 1, wherein the power semiconductor element is a silicon carbide (SIC) junction field effect transistor (JFET).

5. The DC system protection apparatus with a communication resetting function according to claim 1, wherein the current sensor is a Hall effect-based current sensor.

6. The DC system protection apparatus with a communication resetting function according to claim 1, wherein the break threshold is 16 A.

* * * * *